United States Patent Office 3,516,779
Patented June 23, 1970

3,516,779
PROCESS FOR DYEING POLYOLEFINIC MATERIALS
Eiji Koike, Toyonaka-shi, Ryozo Kuriyama and Seizo Naito, Ibaraki-shi, Hiroshi Sugiyama, Ashiya-shi, and Kunihiko Imada, Sakai-shi, Japan, assignors to Sumitomo Chemical Company, Ltd., Osaka, Japan, a corporation of Japan
No Drawing. Filed Oct. 7, 1966, Ser. No. 584,972
Claims priority, application Japan, Oct. 14, 1965, 40/63,087; Nov. 15, 1965, 40/70,428
Int. Cl. D06p 1/32, 3/00
U.S. Cl. 8—32    10 Claims

ABSTRACT OF THE DISCLOSURE

The improvement in dip-dyeing polyolefin materials in a dye bath containing a compound represented by the general formula

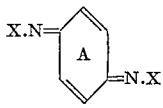

wherein X is a halogen atom, and the nucleus A may be substituted by a halogen lower alkyl or lower alkoxy group, and an aromatic amine, or a benzene, naphthalene or quinoline derivatives, at least one of hydrogen atoms capable of being substituted of the benzene and naphthalene being substituted by hydroxy groups and the other hydrogen atoms being left unsubstituted or substituted with groups other than sulfonic acid group and primary amino groups, which comprises controlling the hydrogen ion concentration of the dye bath within a range of from pH 6 to pH 10 by addition to the bath of a buffer agent.

---

This invention relates to a process for dyeing polyolefin materials, particularly polypropylene fibers, fabrics, films and the like shaped articles, and blended or mix-woven polypropylene products and the like materials.

More particularly, the invention pertains to a method for dyeing said polyolefin materials in a dye bath containing in a water-suspended state a compound represented by the general formula,

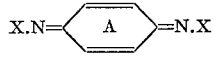

wherein X is a halogen atom; and the nucleus A may have as a substituent a halogen, lower alkyl group or lower alkoxy group, and an aromatic amine such as, for example, a nucleus substituted or non-substituted aniline derivative, naphthylamine derivative or benzidine derivative, or a benzene, naphthalene or quinoline derivatives, at least one of hydrogen atoms capable of being substituted of the benzene and naphthalene being substituted by hydroxy groups and the other hydrogen atoms being left unsubstituted or substituted with other groups than sulfonic acid group and primary amino groups, characterized in that the hydrogen ion concentration of said dye bath is always maintained, from the beginning to the completion of dyeing, within the range of from 6 to 10, by controlling said concentration using a buffer agent or suitable alkali and acid in combination.

Japanese patent publication No. 24,658/64, {Chem. Abstracts, vol. 62, 11950a (1965)} discloses a method for preparing dyes comprising blending compounds represented by the aforesaid general formula (though lower alkoxy group-substituted compounds are not described therein) with aromatic amines, and that said dyes can dye polyolefin fibers or the like shaped articles to black. When polyolefin fibers are dyed, according to the process set forth in Example 1 of said Japanese patent publication, there are some cases where the fibers are dyed to black, however, the process is low in reproducibility, and the desired black color is not obtained but the treated fibers are dyed to brown or the like color due, for example, to slight variations in dyeing temperature, temperature-elevating conditions and dye bath ratio. Further, when the aqueous suspension is used after being allowed to stand, the results of dyeing become uneven according to the lapse of time. Thus, according to the above process, it is difficult in most cases to dye polyolefin fibers with practicality and with high reproducibility.

As the result of studies on the applicability of the aforesaid dyes to polyolefin materials, the present inventors found that, of the various conditions affecting the dyeability of said dyes, such as for example, the hydrogen ion concentration of dye bath, the ratio of compounds represented by said general formula to aromatic amines, temperature-elevating conditions at the time of dyeing, bath ratio, and the stability of dye suspension, the hydrogen ion concentration of dye bath greatly affects the dyeability and stability, and when the hydrogen ion concentration is controlled, it is possible to obtain dyed materials excellent in reproductivity. Employing the above dyeing process, the inventors further examined the compounds represented by the aforesaid general formula to discover that when said compounds are used in combination with such benzene, naphthalene or quinoline derivatives having one or more hydroxy groups as mentioned above, it is possible to dye polyolefin materials like in the case where said compounds are used in combination with aromatic amines.

The mechanism of dyeing using the compounds represented by the aforesaid general formula in combination with the aromatic amines or the benzene, naphthalene or quinoline derivatives having one or more hydroxy group, and the chemical structures of dyes formed on materials to be dyed are not clear, because an oxidation reaction and a condensation reaction are presumed to be brought about during the course of dyeing, and thus the mechanism of dyeing and the chemical structures of dyes formed are quite complex. It is, however, inferred that in a dyeing using, for example, p-dichloroquinonediimine and aniline or phenol, various reaction products as shown below are formed during the course of dyeing depending on the dyeing conditions employed and, of said reaction products, all the effective products are absorbed in a material to be dyed to form on said material a suitable straight chain or reticular high molecular weight dye.

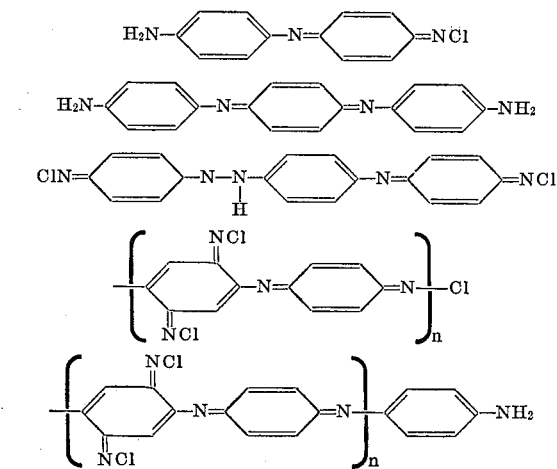

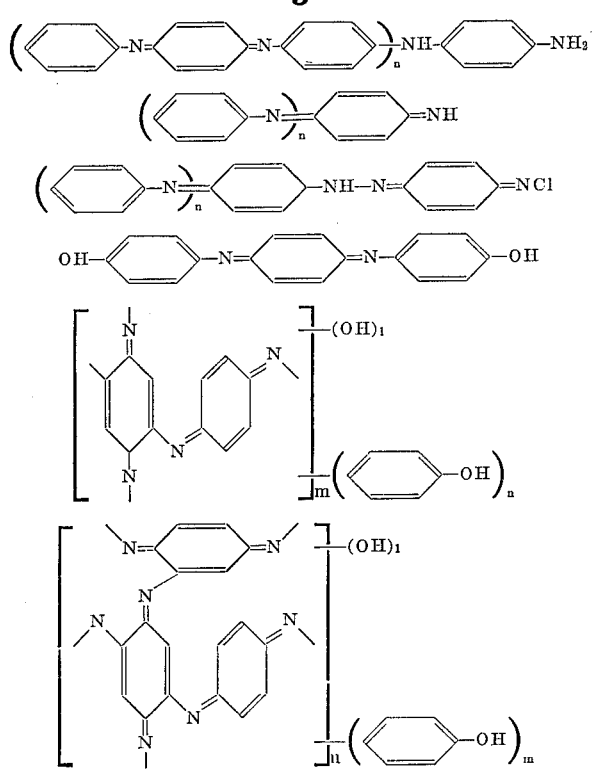

(wherein *l*, *m* and *n* are integers)

The compound represented by the aforesaid general formula and said aromatic amine or said benzene, napthalene or quinoline derivatives having one or more hydroxy group bring about a hydrochloric acid-removing reaction in water. Therefore, when a mere mixture of said two components is used to dye a polyolefin material, acid is liberated as the reaction of said two components progresses in a dye bath, even though the initial hydrogen ion concentration of the bath has been as strongly alkaline as above pH 11. The hydrogen ion concentration varies progressively moment to moment as the dyeing process proceeds to show at the time of completion of dyeing such a considerably strong acidity as about pH 4.5, and even as low as to about pH 2.5 if the initial hydrogen concentration of the bath has been pH 7–8. Therefore, during the course of the above dyeing, there is the possibility that at respective hydrogen ion concentration stages, side reactions corresponding thereto would occur. Moreover, the hydrogen ion concentration is affected by the ratio and amounts of the two components employed, dyeing temperature and bath ratio, so that various intermediary reaction products different from one another are formed even with a slight difference of dyeing conditions to greatly injure the reproducibility of the results of dyeing.

Further, the kinds or forms of the two components employed greatly affect as well the hydrogen ion concentration. For example, in case an inorganic or organic salt of aniline is used as the aniline derivative component, the lowering of the hydrogen ion concentration is also caused by the acid component of the salt itself. Moreover components such as those represented in the above general formula frequently carry with them alkaline agents as impurities from their production. Such incidental substances likewise have influence on the hydrogen ion concentration of the dye bath during the dyeing operation, although this effect varies depending on the preparation step and the manner and extent of purification of said components. In fact, the p-dichloro quinonediimine, prepared according to the method described in Example 1 of Japanese patent publication No. 24,685/64 carries with it a significant amount of calcium hydroxide. Consequently, a dye bath containing 2 g./l. of such quinonediimine is strongly alkaline with a pH of 11.7. When 2 g./l. of aniline is added to said dye bath and a polyolefin fiber is dyed in the bath, the hydrogen ion concentration of the bath at the time of completion of the dyeing shows, conversely, such a considerably strong acidity as pH 5.2. Such changes in the pH during the dyeing results in various side reactions with consequent lack of reproducibility in the dyeing.

As the result of earnest studies, the present inventors have found that the poor reproducibility of said dyeing method is ascribable to the variation, during dyeing, of hydrogen ion concentrations over a wide range, and that in neutral and acidic aqueous suspensions, the compounds represented by the aforesaid general formula are stable by themselves without causing hydrolysis or self-condensation, whereas in alkaline aqueous suspensions, particularly in those having hydrogen ion concentrations of above pH 10, said compounds are quite unstable due to hydrolysis or self-condensation. For example, when a 2 g./l. aqueous suspension of p-dichloroquinonediimine is thermally treated at 80° C. for 60 minutes, the amount of residue formed is about 65%, while in the case of a 1 g./l. suspension, said amount is about 40%. Moreover, the decomposition product or condensate has little adsorptivity for polyolefin materials. On the other hand, when the compound represented by the aforesaid general formula and said aromatic amine are present together in a dye bath, the reaction of the two is accelerated in the aqueous bath with increasing acidity, and in case the hydrogen concentration is below pH 5, there is formed in a markedly short period a high molecular weight compound which is difficultly deposited on the material to be dyed. Conversely, the reaction rate of the two components is considerably slowed with increasing alkalinity. Thus, the stability in water of the compound represented by the aforesaid formula and the reactivity of the two components are entirely contrary to each other in results with respect to hydrogen ion concentration. In view of the above, the present inventors found that the control of hydrogen ion concentration of a dye bath is a required condition to perform suitable dyeing and to obtain results excellent in reproducibility. Based on the above finding, the present inventors could attain quite satisfactory dyeing results by controlling, using a buffer agent or suitable alkali and acid in combination, the hydrogen ion concentration of dye bath so that said concentration is always maintained, from the initiation to completion of dyeing, within the range of from pH 6 to pH 10, most preferably at about neutral. By the control of hydrogen ion concentration, it has become possible to use as such the compounds represented by the aforesaid general formula which have been incorporated with more or less amounts of alkali agent, and to prevent detrimental effects on dyeing results, despite the presence of more or less amount of acid liberated, during the dyeing course, due to a slight variation in bath ratio or dyeing temperature. Thus, the present inventors have been able to attain excellent reproducibility.

Examples of the combinations of agents which give the buffering activity of pH 6 to 10, of the present invention, are:

| | pH |
|---|---|
| Monosodium dihydrogen phosphate with caustic soda | 6–8 |
| Monopotassium dihydrogen phosphate with caustic soda | 6–8 |
| Boric acid added potassium chloride with caustic soda | 7.8–10 |
| Disodium hydrogen phosphate with monopotassium dihydrogen phosphate | 6–8 |
| Sodium citrate with caustic soda | 6–7 |
| Borax with hydrochloric acid | 7.5–9 |
| Glycocoll with caustic soda | 8–10 |
| Monopotassium dihydrogen phosphate with borax | 7.5–9 |
| Citric acid with disodium hydrogen phosphate | 6–8 |

| | pH |
|---|---|
| Boric acid added sodium chloride with borax | 7–9 |
| Sodium bibarbiturate with hydrochloric acid | 7–9 |
| Sodium dimethylglycine with hydrochloric acid | 8.5–10 |
| Boric acid added potassium chloride with sodium carbonate | 7.8–10 |
| Sodium bimaleate with caustic soda | 6–7 |
| Monopotassium dihydrogen phosphate added sodium bicarbonate with sodium chloride | 6–7.6 |
| o-Phosphoric acid added phenyl acetate and borax with caustic soda | 6–10 |
| Monosodium dihydrogen phosphate with disodium hydrogen phosphate | 6.5–8.5 | and the like. Buffering effect is obtained when these agents are combined in suitable amounts to result in the pH range indicated.

As acids and alkalis which are used to adjust the pH, though these would not have buffering actions, there are, for example:

Inorganic acids such as hydrochloric acid, sulfuric acid, nitric acid, phosphoric acid, etc.
Organic acids such as formic acid, acetic acid, lactic acid, oxalic acid, etc.
Inorganic alkalis such as caustic soda, sodium carbonate, sodium bicarbonate, sodium phosphate, caustic potash, calcium hydroxide, potassium phosphate, etc.

It is to be noted that all inorganic or organic acids and inorganic alkalis, with the exception of ammonia or ammonium salts, can be used.

Furthermore, the inventors have observed very many advantages in points unknown heretofore, as mentioned below.

(1) The dyeing reaction can be completed in a period far shorter than in the case where an alkali agent-incorporated dye bath (at a pH above 10) is used.

(2) Polyolefin materials dyed to sufficiently fast black or brown can be obtained even at such a relatively low temperature as 60–70° C.

(3) Aqueous dispersions of the compounds represented by the aforesaid general formula are sufficiently stable in at least a practical range, with the result that the compounds are not required in excess amounts and thus satisfactory dyeing results can be obtained even when the amounts of said compound employed are reduced.

(4) The scope of usable aromatic amines or said benzene, naphthalene or quinoline derivatives having one or more hydroxy groups, which are to be used in combination with the said compound, are extremely broadened and, for example, heretofore unusable aromatic amines may be used to give dyed materials having color tones of not only from black to brown but from blue to purple.

Hues obtained in accordance with the process of the present invention, when represented by Munsell renotation, are as follows:

Black—
 Hue: 5 pB–5 B
 Value: less than 2
 Chroma: about 0.1

For example, when 3.5% oWf of aniline and 4.5% oWf of p-dichloroquinonediimine are used, a black color of 5 pB 1.69/0.1 is obtained.

Brown—
 Hue: 5 YR–10 R
 Value: less than 4
 Chroma: less than 4
Violet—
 Hue: about 7.5 p
 Value: less than 3
 Chroma: less than 4
Navy—
 Hue: 7.5 pB–10 pB
 Value: less than 2
 Chroma: less than 2

The above hues are always obtained with high reproducibility.

The dyes employed in the process of the present invention are the compounds represented by the aforesaid general formula, such as for example, p-dichloroquinonediimine and p-dibromoquinonediimine or their 2-chloro-, 2-bromo-, 2-ethyl-, 2-methoxy-, 2-ethoxy-, 2,6-dichloro-, 2,5-dichloro-, 2,5-dimethyl-, 2,5-dimethoxy- and 2,5-diethoxy- substituents, or mixtures thereof. These compounds are synthesized by halogenating at low temperatures corresponding substituted or unsubstituted para-phenylenediamine derivatives with a halogenating agent such as sodium hypochlorite or bleaching powder, followed by oxidation with an oxidizing agent. These are advantageously mixed, during or after the synthesis, with suitable dispersing agents, e.g. formaldehyde condensate of alkylnaphthalene-sulfonic acid, to be provided, in practice, in the form of dry powders, granules, wet pastes or aqueous suspensions. Likewise, the incorporation, at each stage of the synthesis or finishing, of a buffer agent so that the hydrogen ion concentration of aqueous solutions becomes pH 6–8, is particularly advantageous in the sense of preventing the compounds from decomposition during synthesis, storage and dyeing.

The nucleus-substituted or unsubstituted aniline derivatives employed in the process of the present invention include, for example, aniline, o-toluidine, m-toluidine, p-toluidine, N-methyl-m-toluidine, o-chloroaniline, m-chloroaniline, p-chloroaniline, o-nitroaniline, m-nitroaniline, o-phenylenediamine, m-phenylenediamine, p-phenylenediamine, 2,4 - toluylenediamine, diethyl - p-phenylenediamine, o-aminophenol, m-aminophenol, p-aminophenol, anthranylic acid, o-anisidine, m-anisidine, p-anisidine, o-phenetidine, p-phenetidine, m-xylidine, p-xylidine, 2,3-dimethylaniline, N-methylaniline, N-ethylaniline, N,N'-dimethylaniline, N,N'-diethylaniline, 3-hydroxy-N-diethylaniline, 2,5-dimethoxyaniline, 2,5-diethoxyaniline, N,N' - β - naphthyl-p-phenylenediamine, N,N'-diphenyl-p-phenylenediamine, N-phenyl - N' - isopropyl-p-phenylenediamine, 2 - methoxy-5-methylaniline, 2,4-dimethoxy-5-chloroaniline and 2,5 - dimethoxy - 4-chloroaniline, and further α-naphthylamine, β-naphthylamine and derivatives thereof, diphenylamine and derivatives thereof, benzidine, dichlorobenzidine, benzidinederivatives such as o-tolidine, m-tolidine and o-dianisidine, inorganic and organic acid salts thereof such as hydrochlorides, sulfates, phosphates and acetates, and mixtures thereof.

The benzene, naphthalene or quinoline derivatives, at least one of hydrogen atoms capable of being substituted of the benzene and naphthalene being substituted by hydroxy groups and the other hydrogen atoms being left unsubstituted or substituted with other groups than sulfonic acid group and primary amino groups, which are employed in the process of the present invention include, for example, phenol, o-, m- and p-cresols, o- and p-butylphenols, o- and p-octylphenols, o- and p-cyclohexylphenols, 2,4-xylenol, 3,5-xylenol, 2-butyl-4-cresol, 4-amyl-2-cresol, 6-butyl-3-cresol, o- and p-phenylphenols, o-, m- and p-chlorophenols, o-, m- and p-nitrophenols, o- and p-hydroxybenzoic acids and methyl, ethyl and butyl esters thereof, N-dimethyl and diethyl-m-aminophenols, o-, m- and p-acetylaminophenols, m-hydroxy-diphenylamine, 3-hydroxy-2'-methyldiphenylamines, catechol, resorcinol and hydroquinone and monomethyl and monoethyl ethers thereof, pyrogallol, α-naphthol, β-naphthol, 4-methyl-α-naphthol, 4-methoxy-α-naphthol, 4,8-dimethoxy-α-naphthol, 5,8-dichloro-α-naphthol, 1,5 and 2,3-dihydroxynaphthalenes, α- and β-hydroxynaphthoic acids and methyl and ethyl esters thereof, β-hydroxynaphthoic acid anilide and alkyl, alkoxy and halogen substituents thereof, 8-hydroxyquinoline, 2,4-dihydroxyquinoline, and N-methyl and N-butyl-2,4-dihydroxyquinolines. These compounds may be used not only as such but as corresponding phenolates such as sodium and potassium. These may be used either independently or in admixture of two or more. Further, like the compounds represented by the aforesaid general formula, the above compounds may be used in admixture with dispersing agents such as formaldehyde condensate of alkylnaphthalene-sulfonic acid. The admixing therewith is particularly advantageous for water-insoluble or difficulty water-soluble components.

In the present invention, the first component (the compound represented by the aforesaid general formula) and the second component (said aromatic amine or benzene, naphthalene or quinoline derivative may be added to the dye bath separately in optional order, or may be first mixed and then added to the bath).

As the hydrophobic materials, to which the process of the present invention is applied, polyolefin materials such as polyethylene and polypropylene are particularly preferred. In addition thereto, however, there may be used other synthetic fibers, e.g. polyamide materials, polyacrylonitrile materials, polyvinyl materials such as polyvinyl chloride, polyvinylidene chloride, polyvinyl acetate and polystyrene, cellulose acetate materials, and polyester materials such as polyethylene terephthalate and copolymers of pentaerythritol with isophthalic acid, paraoxybenzoic acid and methoxypolyethylene glycol. These materials are used in the form of fibers, fabrics, films and the like shaped articles, or blended or mix-woven products thereof.

In dyeing the polyolefin materials, there are some cases where certain polyolefin materials are scarcely dyed or are dyed merely to very light brown. In such cases, said polyolefin materials are first subjected to acid treatment at an elevated temperature in an aqueous solution of an inorganic acid alone or, desirably, in combination with a nonionic surface active agent, and are then dyed according to the process of the present invention, whereby the materials are successfully dyed to black. As said inorganic acid, there may be used sulfuric, nitric or hydrochloric acid.

An example of dyeing in accordance with the process of the present invention is as follows:

The first and second components of the present invention are respectively formed, at an optional proportion, into an aqueous emulsion or dispersion using one or more anionic or nonionic surface active agents such as, for example, naphthalenesulfonic acid-formaldehyde condensate, polyoxyethylene alkylaryl ether, or sulfonic ester or phosphoric ester; polyoxyethylene alkyl ether, or sulfonic ester or phosphoric ester; or polyoxyethylene fatty acid ester. The second component is charged into a dye bath, and then the hydrogen ion concentration of the dye bath is adjusted to pH 6–10, preferably about 7, using a buffer agent such as, for example, monosodium dihydrogen phosphate and disodium monohydrogen phosphate. Subsequently, the first component is added, and then a polyolefin material is charged in the dye bath and is dyed at 60–100° C., preferably 70–80° C., for 40–90 minutes, whereby the polyolefin material is successfully dyed to black, brown or purple.

The material to be dyed may be charged in the dye bath either before or after the addition of dye composition.

The weight ratio of dye components to fiber and the proportion of two dye components are substantially arbitrary and are variable depending on the kind of the employed aromatic amine or benzene, naphthalene or quinoline derivative having hydroxy group, the desired hue and the concentration, as well as on the kind and form of the polyolefin material to be dyed. For example, in order to obtain black color, the weight ratio of dye to fiber is desirably at least 3%, and the proportion of the two components is variable to such a broad range as from 0.1:1 to 1:0.1, but is desirably within the weight ratio range of from 0.5:1 to 1:1 in order to obtain a deep color. Further, the use of said surface active agent itself is not a required condition for dyeing but is preferable in order to obtain a more uniformly dyed material.

The order of addition to a dye bath of the two components and a material to be dyed is not substantially restricted either and, in practice, they may be added in an optional order and the two components may first be blended and then charged in a dye bath.

As mentioned above, in the case, in order to control the hydrogen ion concentration of a dye bath, a buffer agent has been added to the dye bath or has been incorporated into the dye, the hydrogen ion concentration of the dye bath does not greatly change even during the dyeing but can always be maintained within a required range. Alternatively, a suitable acid or alkali is used, without using the buffer agent, to control the hydrogen ion concentration every moment in the preparation of the dye bath or during the dyeing, the material can likewise be dyed.

As detailed above, the control of hydrogen ion concentration before and during dyeing results in many such advantages as mentioned above. In the dyeing process carried out by use of the compounds represented by the aforesaid general formula in combination with said aromatic amines or benzene, naphthalene or quinoline derivatives having hydroxy groups, it is difficult without said control to obtain with high reproductivity a dyed substance having desired hue and dye concentration. Thus, the control of hydrogen ion concentration is considered indispensable in practice. For example, when a polyolefin material was dyed in a dye bath of the same prescription as in the example shown later according to the same dyeing method as in the example, without using any buffer agent or suitable acid or alkali, i.e. without controlling the hydrogen ion concentration of the dye bath, the polyolefin material could not be dyed except to light brown or light grey color.

Materials dyed in accordance with the present dyeing process can be further improved in fastness to rubbing or the like, when subjected to after-treatment at above 70° C. for 10–20 minutes.

Chemicals employed in the after-treatment are hydrosulfide, sodium sulfide, sodium bisulfite, caustic soda and nonionic and amphoteric surface active agents. These may be used either independently or in combination.

Materials dyed according to the process of the present invention have various color tones such as brown, blue, purple or black and are practically satisfactory because they are excellent in fastness to light, sublimation, washing and organic solvents. Further, the present invention is particularly advantageous in that the dyeing process can be easily carried out even at atmospheric pressure.

The following examples illustrate the process of the present invention. It is not intended to limit the invention to the examples. In the examples, all the pH measurements were effected at room temperature. Parts are by weight.

EXAMPLE 1

0.25 part of p-dichloroquinonediimine was dispersed in 100 parts of water, using 0.25 part of a naphthalenesulfonic acid-formaldehyde condensate. To the dispersion were added 0.6 part of $Na_2HPO_4 \cdot 12H_2O$ and 0.2 part of $NaH_2PO_4 \cdot 2H_2O$. Separately, 0.25 part of diphenylamine was dispersed in 100 parts of water, together with 0.25 part of a naphthalenesulfonic acid-formaldehyde condensate. The two dispersions thus obtained were mixed to prepare 200 parts of a dye bath. At this time, the dye bath showed a pH of 7.4. Into the dye bath, 5 parts of a polyolefin fiber, e.g. Pylen (trade name) taffeta cloth, was charged, and the fiber was dyed at 70° C. for 60 minutes. The pH of the dye bath after the dyeing was 7.0. The dyed fiber was then subjected to reduction after-treatment in 200 parts of a bath containing 0.2 part of hydrosulfite, 0.2 part of caustic soda and 0.2 part of an ampholytic surface active agent (Laccol AL, a product of Meisei Kagaku K.K.), whereby a black dyed product excellent in fastness was obtained with high reproductivity.

EXAMPLE 2

0.25 part of p-dichloroquinonediimine was dispersed in 100 parts of water, using 0.25 part of a napthalenesulfonic acid-formaldehyde condensate. To the dispersion were added 0.453 part of $KH_2PO_4$ and 0.114 part of NaOH. Separately, 0.21 part of o-phenylenediamine was dissolved in 100 parts of water. The two liquids thus obtained were mixed to prepare 200 parts of a dye bath. The dye bath showed a pH of 7.6. Into the dye bath, 5 parts of Pylen taffeta cloth was charged, and the cloth was dyed at 80° C. for 60 minutes. The pH of the dye bath was 6.5. The dyed cloth was subjected to reduction after-treatment under the same conditions as in Example 1 to obtain a deep black dyed product excellent in fastness.

EXAMPLE 3

0.25 part of p-dichloroquinonediimine was dispersed in 100 parts of water, using 0.25 part of a potassium salt of polyoxyethylene alkyl ether phosphoric ester. To the dispersion were added 0.42 part of $Na_2HPO_4 \cdot 12H_2O$ and 0.14 part of $NaH_2PO_4 \cdot 2H_2O$. Separately, 0.23 part of N,N'-β-naphthyl-p-phenylenediamine represented by the formula

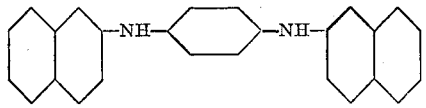

was dispersed in 100 parts of water together with 0.25 part of a potassium salt of polyoxyethylene alkyl ether phosphoric ester. The two dispersions were mixed to prepared 200 parts of a dye bath. At this time, the pH of the dye bath was 7.3. Into the dye bath, 5 parts of a polypropylene fiber was charged and the fiber was dyed at 80° C. for 40 minutes. The pH of the dye bath after the dyeing became 6.7. The dyed fiber was subjected to reduction after-treatment under the same conditions as in Example 1 to obtain a purple dyed product high in fastness.

EXAMPLE 4

0.25 part of anthranilic acid was dissolved in 100 parts of water, and 0.38 part of $Na_2B_4O_7$ (anhydrous) and 0.16 part of HCl (calculated as 100%) were further dissolved therein.

Separately, 0.25 part of 2-methyl-1,4-dichloroquinonediimine was dispersed in 100 parts of water, together with 0.25 part of naphthalenesulfonic acid formaldehyde condensate. The two dispersions thus obtained were mixed to prepare 200 parts of a dye bath. At this time, the dye bath showed a pH of 8.0. Into the dye bath, 5 parts of Pylen (trade name) taffeta cloth, was charged, and the cloth was dyed at 70° C. for 60 minutes. The pH of the dye bath after the dyeing became 6.4. The dyed cloth was subjected to reduction after treatment under the same conditions as in Example 1 to obtain a brown dyed product excellent in fastness.

EXAMPLE 5

0.15 part of aniline was dissolved in 100 parts of water together with 0.2 part of a sodium salt of polyoxyethylene alkyl ether phosphoric ester. To the solution were added 0.86 part of $Na_2B_4O_7 \cdot 10H_2O$ and 0.02 part of HCl (as 100%).

Separately, 0.15 part of 2-chloro-1,4-dichloroquinonediimine was dispersed in 50 parts of water together with 0.2 part of a sodium salt of polyoxyethylene alkyl ether phosphoric ester. The two liquids were mixed and added with water to prepare 200 parts of a dye bath. The pH of the dye bath at this time was 9.1. Into the dye bath, 5 parts of polypropylene taffeta cloth was charged, and the cloth was dyed at 95° C. for 60 minutes. The cloth was then subjected to reduction after treatment under the same conditions as in Example 1 to obtain a uniform deep black dyed product excellent in fastness. The final pH of the dye bath was 8.7.

EXAMPLE 6

0.25 part of p-dichloroquinonediimine and 0.25 part of o-dianisidine were formed into a paste together with 0.4 part of a naphthalenesulfonic acid-formaldehyde condensate, and the paste was dispersed in 200 parts of water. To the dispersion, 0.55 part of $Na_2B_4O_7 \cdot 10H_2O$ and 0.08 part of HCl (calculated as 100%) were added to prepare a dye bath. At this time, the pH of the dye bath was 8.1. Into the dye bath, 5 parts of a polypropylene fiber was charged, and the fiber was dyed under the same conditions as in Example 1 to obtain a deep black dyed fiber excellent in fastness. The final pH of the dye bath was 6.5.

EXAMPLE 7

0.25 parts of 2-methoxy-1,4-dichloroquinonediimine was dispersed in 100 parts of water together with 0.25 part of a naphthalenesulfonic acid-formaldehyde condensate. Separately, 0.25 parts of o-toluidine was dispersed in 100 parts of water together with 0.25 part of a naphthalenesulfonic acid-formaldehyde condensate. The two dispersions were mixed to prepare 200 parts of a dye bath. The pH of the dye bath was about 9.0. To the dye bath, acetic acid was then added to adjust the pH to 8. Into the dye bath, 5 parts of Pylen taffeta cloth was charged, and the dyeing of the cloth was initiated at 80° C., whereby the pH of the dye bath began to lower. The dyeing was carried out for 60 minutes while adding sodium acetate to the bath so that the pH was not lowered to below 6.5. The dyed cloth was subjected to reduction after treatment under the same conditions as in Example 1 to obtain a black dyed product excellent in fastness.

EXAMPLE 8

0.25 part of p-dichloroquinonediimine was dispersed in 100 parts of water, using 0.25 part of sodium polyoxyethylene alkylarylsulfonate. To the dispersion were added 0.42 part of $Na_2HPO_4 \cdot 12H_2O$ and 0.14 part of $NaH_2PO_4 \cdot 2H_2O$. Separately, 0.25 part of α-naphthylamine was dispersed in 100 parts of water together with 0.25 part of sodium salt of polyoxyethylene alkylarylsulfonate. The two dispersions were mixed to prepare 200 parts of a dye bath. At this time, the dye bath showed a pH of 7.4. Into the dye bath, 5 parts of a polypropylene fiber was charged, and the fiber was dyed at 60° C. for 90 minutes. The dyed fiber was then subjected to reduction after treatment under the same conditions as in Example 1 to obtain a fast deep black dyed product. The final pH of the dye bath was 6.8.

EXAMPLE 9

0.25 part of p-dichloroquinonediimine was dispersed in 100 parts of water, using 0.25 part of a polyoxyethylene nonylphenyl ether (Noigen EA–120, a product of Daiichi Kogyo Seiyaku K.K.). To the dispersion was added 0.25 part of a 3:1 mixture of $Na_2HPO_4 \cdot 12H_2O$ and $Na_2HPO_4 \cdot 2H_2O$. Separately, 0.25 part of a sodium salt of o-phenylphenol was dissolved in 100 parts of water, and the solution was neuralized with acetic acid to form a dispersion of o-phenylphenol. The two dispersions were mixed to prepare 200 parts of a dye bath. Into the dye bath, 5 parts of a polypropylene fiber, e.g. Pylen taffeta cloth (a product of Toyo Boseki K.K.), was charged, and the fiber was dyed at 70° C. for 60 minutes. The dyed fiber was then subjected to reduction after treatment at 85° C. for 10 minutes in 200 parts of a bath containing 0.2 part of hydrosulfite, 0.2 part of caustic soda and 0.2 part of an ampholytic surface active agent (Laccol AL, a product of Meisei Kagaku K.K.) to obtain a deep black dyed product excellent in fastness.

The same fast black dyed product as above was obtained as well when there was used in place of said p-dichloroquinonediimine, a derivative thereof having a quinoid nucleus substituted by halogen, alkyl or alkoxy, such as for example, 2-chloro-1,4-dichloroquinonediimine-2-methyl-1,4-dichloroquinonediimine or 2-methoxy-1,4-dichloroquinonediimine.

Further, the same results as above were obtained even when the order of addition to the dye bath of said p-dichloroquinonediimine, o-phenylphenol and pH-controlling agent was optionally changed.

EXAMPLE 10

One part of p-dichloroquinonediimine, 1 part of β-naphthol, 1 part of a 3:1 mixture of $Na_2HPO_4 \cdot 12H_2O$ and $NaH_2PO_4 \cdot 2H_2O$ and 1 part of a naphthalenesulfonic acid-formaldehyde condensate were thoroughly mixed to obtain 4 parts of a dye powder. One part of said dye powder was dispersed in 200 parts of water to prepare a dye bath. Into the dye bath, 5 parts of Pylen sliver (a product of Toyo Boseki K.K.) was charged and the dyeing of the sliver was effected at 70° C. for 60 minutes. The dyed sliver was then subjected to reduction after-treatment at 85° C. for 10 minutes in 200 parts of a bath containing 0.2 part of hydrosulfite, 0.2 part of caustic soda and 0.2 part of an amphlyitc surface active agent (Laccol AL) to obtain a black dyed product excellent in fastness.

In this example, α-naphthol or α-hydroxynaphthoic acid was used in place of the β-naphthol to obtain the same black dyed product as above.

EXAMPLE 11

0.25 part of phenol was dispersed in 100 parts of water together with a naphthalenesulfonic acid-formaldehyde condensate. To the dispersion was added 0.25 part of a 3:1 mixture of $Na_2HPO_4 \cdot 12H_2O$ and $NaH_2PO_4 \cdot 2H_2O$. Separately, 0.125 part of p-dichloroquinonediimine was dispersed in 100 parts of water together with a naphthalene sulyfonic acid-formaldehyde condensate. The two dispersions were mixed to prepare 200 parts of a dye bath. Into the dye bath, 5 parts of Pylen taffeta cloth (a product of Toyo Boseki K.K.) was charged and the cloth was dyed at 80° C. for 40 minutes. The dyed fiber was then subjected to after-treatment at 95°–100° C. for 20 minutes in a bath containing 0.4 part of caustic soda, 0.4 part of sodium bisulfite and 0.2 part of an ampholytic surface active agent (Laccol AL) to obtain a brown dyed product excellent in fastness.

In this example, the use of o-chlorophenol or 2,4-dimethylphenol in place of the phenol resulted in a fast deep brown dyed product, and the use of o-cresol, m-cresol or 3,5-dimethylphenol in place thereof resulted in a fast deep black dyed product.

EXAMPLE 12

0.25 part of 3-methyl-6-t-butylphenol was dispersed in 200 parts of water together with 0.25 part of a naphthalenesulfonic acid-formaldehyde condensate. Into a bath of the thus obtained dispersion, Pylen taffeta cloth (a product of Toyo Boseki K.K.) was charged, and the cloth was treated at 100° C. for 50 minutes and was then washed with water. Separately, 0.25 part of p-dichloroquinonediimine was dispersed in 100 parts of water together with a naphthalenesulfonic acid-formaldehyde condensate. To the dispersion, 0.25 part of a 3:1 mixture of $Na_2HPO_4 \cdot 12H_2O$ and $NaH_2PO_4 \cdot 2H_2O$ was added to prepare a dye bath. Into this dye bath, the Pylen taffeta cloth subjected to the above treatment was charged, and the dyeing of the cloth was effected at 70° C. for 40 minutes. The dyed cloth was then subjected to reduction after-treatment at 85° C. for 10 minutes in 200 parts of a bath containing 0.2 part of hydrosulfite, 0.2 part of caustic soda and 0.2 part of an ampholytic surface active agent (Laccol AL) to obtain a black brown dyed product excellent in fastness.

EXAMPLE 13

0.25 part of 2-chloro-1,4-dichloroquinonediimine was dispersed in 100 parts of water together with 0.25 part of a naphthalenesulfonic acid-formaldehyde condensate. Separately, 0.25 part of 8-oxyquinoline was dispersed in 100 parts of water together with 0.25 part of a naphthalenesulfonic acid-formaldehyde condensate. The two dispersions were mixed to obtain 200 parts of a bath. To this bath, 0.25 part of a 3:1 mixture of $Na_2HPO_4 \cdot 12H_2O$ and $NaH_2PO_4 \cdot 2H_2O$ was added to prepare a dye bath. Into this dye bath, 5 parts of Pylen taffeta (a product of Mitsubishi Rayon K.K.) was charged, and the dyeing of the taffeta was effected at 90° C. for 60 minutes. The dyed taffeta was then subjected to reduction after-treatment at 85° C. for 20 minutes in 200 parts of a bah containing 0.5 part of sodium sulfide, 0.2 part of caustic soda and 0.2 part of a nonionic surface active agent (Noigen EA-120) to obtain a deep black dyed product excellent in fastness.

What we claim is:

1. In a process for dip dyeing polyolefin materials in a dye bath containing (I) a compound represented by the general formula

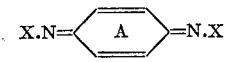

wherein X is a halogen atom, and the nucleus A may be substituted by a halogen, lower alkyl or lower alkoxy group, and (II) an aromatic amine, or a benzene, naphthalene or quinoline derivatives, at least one of hydrogen atoms capable of being substituted of the benzene and naphthalene being substituted by hydroxy groups and the other hydrogen atoms being left unsubstituted or substituted with groups other than sulfonic acid group and primary amino groups, the improvement which comprises controlling the hydrogen ion concentration of the dye bath within a range of from pH 6 to pH 10.

2. The improvement according to claim 1, wherein the said control is effected by using a buffer agent chosen from the combination of monosodium dihydrogen phosphate with caustic soda, monopotassium dihydrogen phosphate with caustic soda, boric acid added potassium chloride with caustic soda, disodium hydrogen phosphate with monopotassium dihydrogen phosphate, sodium citrate with caustic soda borax with hydrochloric acid, glycocoll with caustic soda, monopotassium dihydrogen phosphate with borax, citric acid with disodium hydrogen phosphate, boric acid added sodium chloride with borax, sodium bibarbiturate with hydrochloric acid, sodium dimethylglycine with hydrochloric acid, boric acid added potassium chloride with sodium carbonate, sodium bimaleate with caustic soda monopotassium dihydrogen phosphate added sodium bicarbonate with sodium chloride o-phosphoric acid added phenyl acetate and borax with caustic soda, or monosodium dihydrogen phosphate with disodium hydrogen phosphate.

3. The improvement according to claim 1, wherein the said polyolefin is polypropylene.

4. The improvement according to claim 1, wherein the said compound is p-dichloroquinonediimine and p-dibromoquinonediimine or their 2-chloro-, 2-bromo-, 2-methyl-, 2-ethyl-, 2-methoxy-, 2-ethoxy-, 2,6-dichloro-, 2,5-dichloro-, 2,5-dimethyl-, 2,5-dimethoxy- and 2,5-diethoxy-substituents, or mixtures thereof.

5. The improvement according to claim 1, wherein the said aromatic amine is aniline, o-toluidine, m-toluidine, p-toluidine, N-methyl-m-toluidine, o-chloroaniline, m-chloroaniline, p-chloroaniline, o-nitroaniline, m-nitroaniline, o-phenylenediamine, m-phenylenediamine, p-phenylenediamine, 2,4-toluylenediamine, diethyl-p-phenylenediamine, o-aminophenol, m-aminophenol, p-aminophenol, anthanylic acid, o-anisidine, m-anisidine, p-anisidine, o-phenetidine, p-phenetidine, m-xylidine, p-xylidine, 2,3-dimethylaniline, N-methylaniline, N-ethylaniline, N,N'-dimethylaniline, N,N'-diethylaniline, 3-hydroxy-N-diethylaniline, 2,5-dimethoxyaniline, 2,5-diethoxyaniline, N,N' - β - naphthyl-p-phenylenediamine, N,N'-diphenyl-p-phenylenediamine, N-phenyl-N'-isopropyl-p-phenlyenediamine, 2-methoxy-5-methylaniline, 2,4-dimethoxy-5-chloroaniline and 2,5-dimethoxy-4-chloroaniline, and further α-naphthylamine, β-naphthylamine and derivatives thereof, diphenylamine and derivatives thereof, benzidine, dichlorobenzidine, benzidine derivatives such as o-tolidine, m-tolidine and o-dianisidine, inorganic and organic acid salts thereof such as hydrochlorides, sulfates, phosphates and acetates, and mixtures thereof.

6. The improvement according to claim 1, wherein the said benzene, naphthalene or quinoline derivatives are phenol, o-, m- and p-cresols, o- and p-butylphenols, o- and p-octylphenols, o- and p-cyclohexylphenols, 2,4-xylenol, 3,5-xylenol, 2-butyl-4-cresol, 4-amyl-2-cresol, 6-butyl-3-cresol, o- and p-phenylphenols, o-, m- and p-chlorophenols, o-, m- and p-nitrophenols, o- and p-hydroxybenzoic acids and methyl, ethyl and butyl esters thereof, N-dimethyl- and diethyl-m-aminophenols, o-, m- and p-acetylamino-phenols, m-hydroxy-diphenylamine, 3-hydroxy - 2'-methyldiphenylamines, catechol, resorcinol and hydroquinone and monomethyl and monoethyl ethers thereof, pyrogallol, α-naphthol, β-naphthol, 4-methyl-α-naphthol, 4-methoxy-α-naphthol, 4,8-dimethoxy-α-naphthol, 5,8-dichloro-α-naphthol, 1,5- and 2,3-dihydroxynaphthalenes, α- and β-hydroxynaphthoic acids and methyl and ethyl esters thereof, β-hydroxy-naphthoic acid anilide and alkyl, alkoxy and halogen substituents thereof, 8-hydroxyquinoline, 2,4-dihydroquinoline, and N-methyl- and N-butyl-2,4-dihydroxyquinolines.

7. The improvement according to claim 2 wherein the concentration of component (I) in the dye bath is about 0.125%.

8. The improvement according to claim 5 wherein component (I) is p-dichloroquinonediimine and its concentration in the dye bath is 1.25%.

9. The improvement according to claim 7 wherein component (II) is diphenylamine.

10. The improvement according to claim 9 wherein the polyolefin is polypropylene.

References Cited

FOREIGN PATENTS

| 24,658 | 1964 | Japan. |
|---|---|---|
| 686,511 | 5/1964 | Canada. |

NORMAN G. TORCHIN, Primary Examiner

J. E. CALLAGHAN, Assistant Examiner

U.S. Cl. X.R.

260—396